(12) United States Patent
Partridge

(10) Patent No.: US 9,647,533 B2
(45) Date of Patent: May 9, 2017

(54) PFC CIRCUITS WITH VERY LOW THD

(71) Applicant: ONE MORE TIME LLC, Apple Valley, CA (US)

(72) Inventor: Donald F. Partridge, Apple Valley, CA (US)

(73) Assignee: One More Time LLC, Apple Valley, CA (US)

( * ) Notice: Subject to any disclaimer, the term of this patent is extended or adjusted under 35 U.S.C. 154(b) by 0 days.

(21) Appl. No.: 14/536,580

(22) Filed: Nov. 7, 2014

(65) Prior Publication Data

US 2015/0162823 A1 Jun. 11, 2015

Related U.S. Application Data

(60) Provisional application No. 61/902,121, filed on Nov. 8, 2013.

(51) Int. Cl.
*H02M 1/42* (2007.01)

(52) U.S. Cl.
CPC ....... *H02M 1/4216* (2013.01); *H02M 1/4225* (2013.01); *H02M 1/4258* (2013.01); *Y02B 70/126* (2013.01); *Y02P 80/112* (2015.11)

(58) Field of Classification Search
CPC .... H02M 1/42; H02M 1/4216; H02M 4/4225; H02M 1/4233; H02M 1/4258
See application file for complete search history.

(56) References Cited

U.S. PATENT DOCUMENTS

| 6,055,167 A | * | 4/2000 | Shamkovich | ....... H02M 1/4225 323/300 |
| 2005/0248323 A1 | * | 11/2005 | Lathrop | .................... G05F 1/70 323/222 |

* cited by examiner

*Primary Examiner* — Jeffrey Gblende
(74) *Attorney, Agent, or Firm* — Blakely, Sokoloff, Taylor & Zafman LLP

(57) ABSTRACT

A boost chopper circuit is described that an alternating current (AC) power source; at least one inductor connected to said AC power source; a rectifier connected to said inductor and AC power source; at least one switch shorting our said rectifier; a series circuit connected in parallel with said switch of at least one diode and a capacitor; and a load connected in parallel with said capacitor. A control technique is employed that includes turning on and off the switch in order to keep the average current per pulse cycle proportional to the AC input voltage during the same pulse cycle.

3 Claims, 10 Drawing Sheets

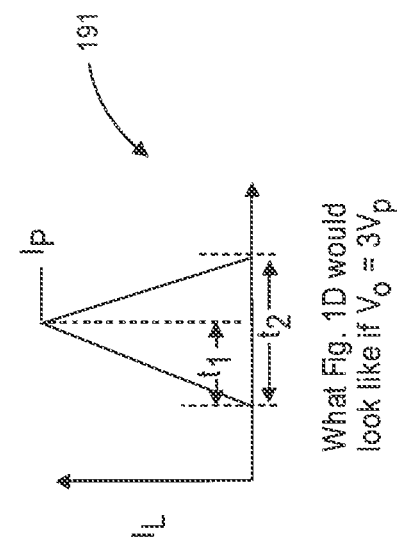
FIG. 1E
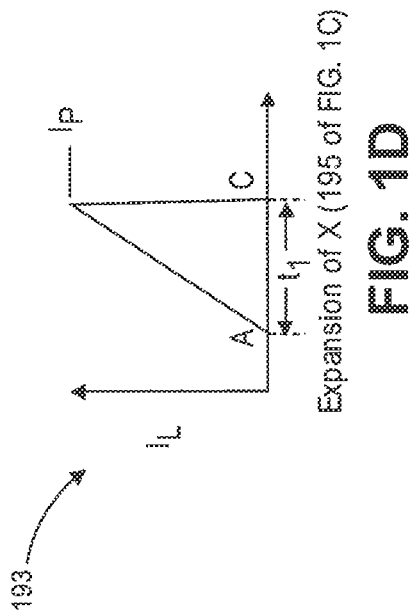
FIG. 1D
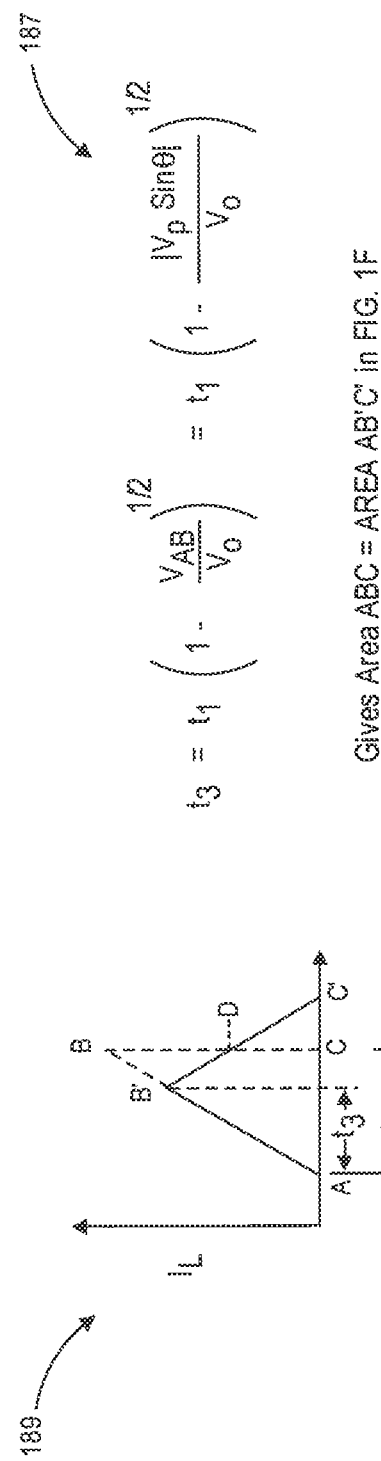
FIG. 1G
FIG. 1F

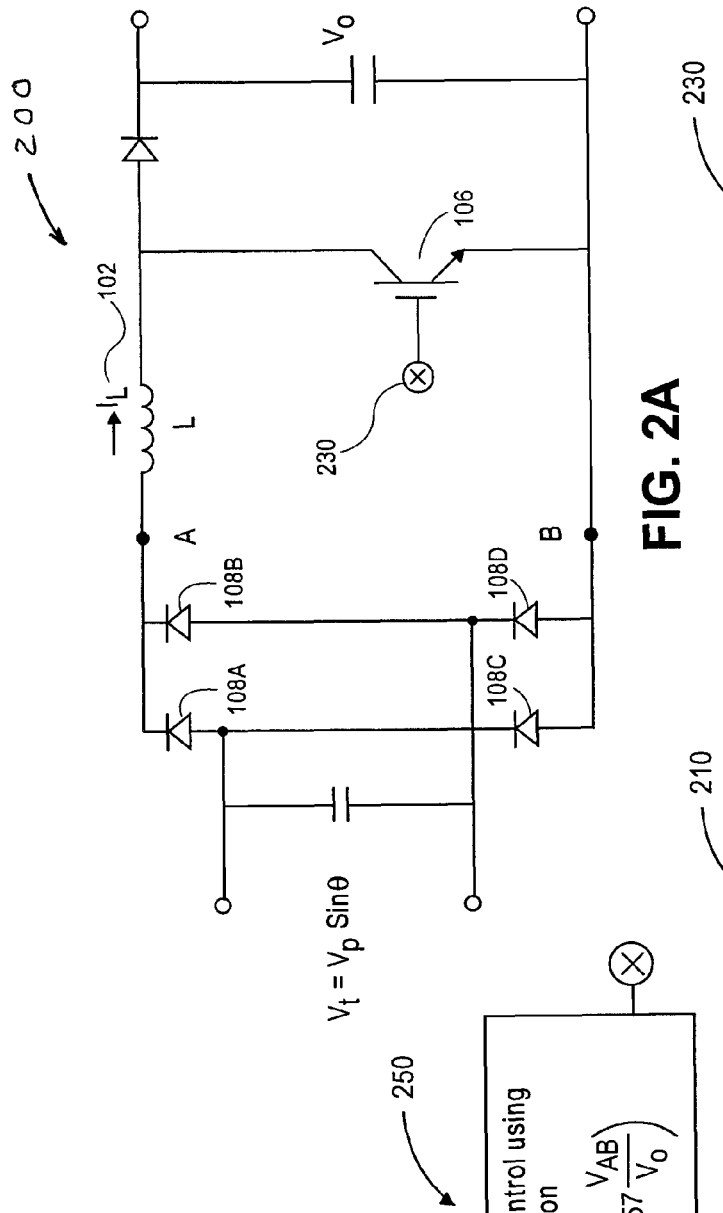

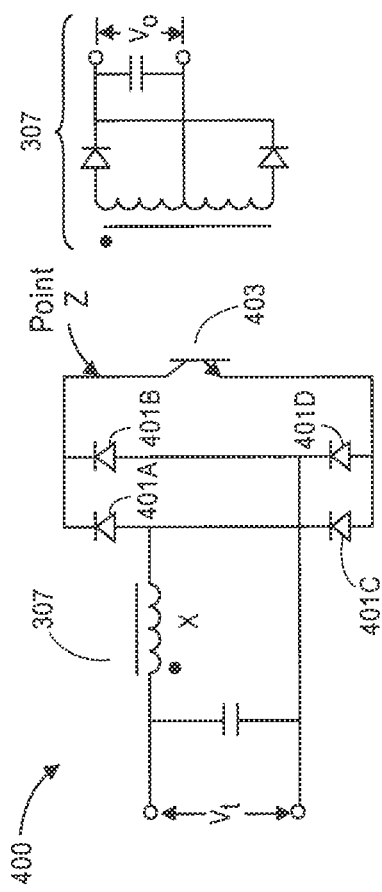
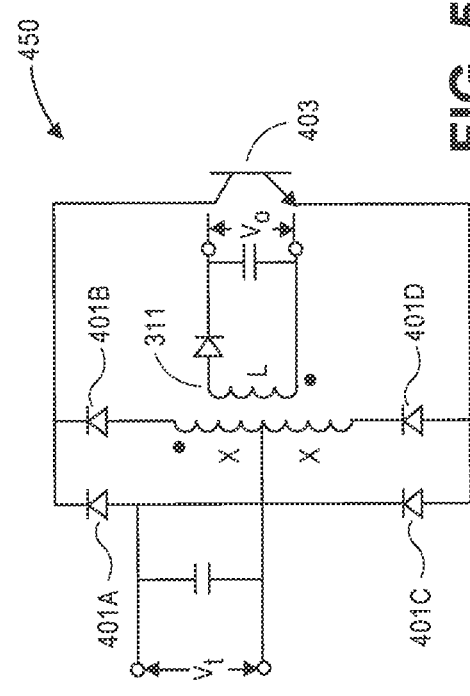
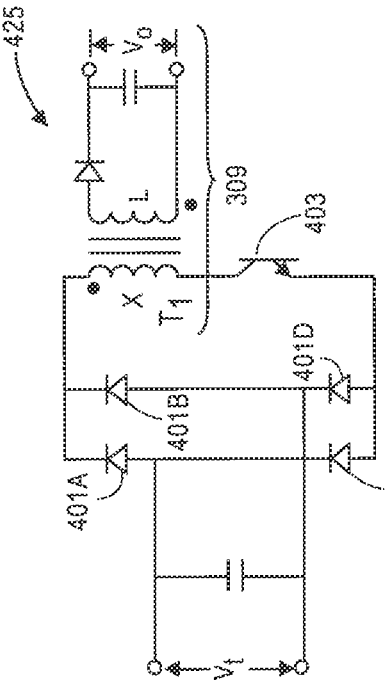
FIG. 4
FIG. 5A
FIG. 5B

PFC CIRCUITS WITH VERY LOW THD

CROSS-REFERENCE TO RELATED APPLICATION

The present application claims the benefit of provisional application No. 61/902,121, filed on Nov. 8, 2013, entitled PFC CIRCUITS WITH VERY LOW THD, which is hereby incorporated by reference.

FIELD

Embodiments described herein relate to power factor correction ("PFC") circuits; and more specifically, to PFC circuits with very low total harmonic distortion ("THD").

BACKGROUND

THD (Total Harmonic Distortion) and the Power Factor (pf) in 1-phase and 3-phase Alternating Circuit (AC) input lines have been major problems for many years. The THD of 1-phase and 3-phase systems with Inductor-Capacitor (LC) filters is 120% and 28%, respectively. With capacitor input filters, the THD is considerably higher.

Regulatory authorities continue to increase their specifications. When they learn details of the present embodiments, it is possible they may want to significantly increase their specifications.

SUMMARY

Embodiments described herein can obtain a pf=1 and a THD of less than 0.001% when minimum cost is not a requirement.

The described embodiments include two different methods that use three different basic topologies to obtain a very low THD (<=0.01%) and a pf=1 in 1-phase and 3-phase input voltage systems.

The first method includes a control method to vary the pulse width of a gate driver in such a way that the average current during the pulse cycle is proportional to the AC voltage during that pulse cycle. This control method is done each pulse cycle.

The second method includes using a concept wherein the average current during the pulse cycle is naturally proportional to the AC voltage during each pulse cycle using two different basic topologies. The two basic topologies are using half bridges and full bridges in their outputs.

The full bridge versions are best suited for fixed voltage loads. The half bridge versions are best suited for variable voltage outputs either current or voltage regulated.

Other objects, features, and advantages of the embodiments described herein will be apparent from the accompanying drawings and from the detailed description that follows below.

BRIEF DESCRIPTION OF THE DRAWINGS

Embodiments described herein are illustrated by way of example and not limitation in the figures of the accompanying drawings, in which like references indicate similar elements.

FIGS. 1B-1E are used in detailing a problem of FIG. 1A.

FIGS. 1F-1G are used in detailing one of several control concepts that solves the problem of FIG. 1A.

FIG. 2A is the same drawing as FIG. 1A.

FIGS. 2B-2D illustrate details of several control concepts that solve the problem of FIG. 1A.

FIG. 4 is the same as FIG. 3A where the bi-directional switch of FIG. 3A is replaced with four diodes and one switch.

FIG. 5A is the same as FIG. 4 with the transformer moved in series with the switch (point Z of FIG. 4). Note that because the voltage applied to the transformer is only positive, only a half bridge is required in the secondary.

FIG. 5B is a modification of FIG. 5A wherein two primaries of the transformer are used. When the AC voltage reverses polarity, the other primary is used.

DETAILED DESCRIPTION

The new topologies described below are low cost AC to DC power factor correction (PFC) circuits that have very low Total Harmonic Distortion (THD) in the AC input that are very cost effective from watts to megawatts. The new topologies work in both 1 and 3-phase AC lines and require only one switching device. Most of the new topologies can be run either isolated or non-isolated with negligible difference in cost. It has been found that a standard boost circuit has a high THD except under some extreme conditions. One of the embodiments is a method of controlling the pulse width of the control signal of a standard boost circuit in such a way that the THD is lowered to a very low value—i.e., <0.1%, under most conditions. The power factor (pf) in the AC lines is one. The normal THD in 1 and 3-phase systems with an inductive input filter is approximately 120% in single phase and 28% in 3-phase systems. In 3-phase applications, several different topologies have been found that give the same low THD and high pf while still using only one switching device. In some topologies it is advantageous to use two switching devices with lower voltage rating and lower switching losses than the one switching device topologies. The new topologies can be run either isolated or non-isolated with negligible difference in cost.

Figure 1A:
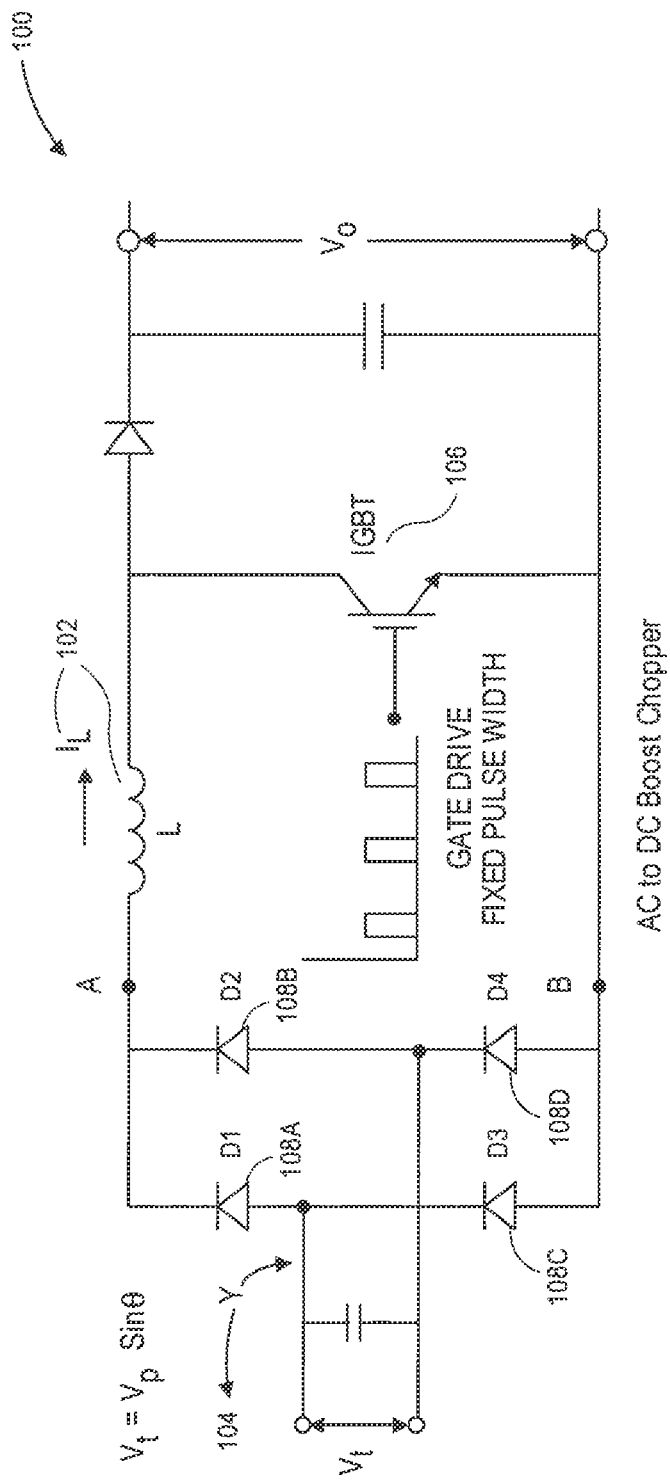
FIG. 1A is a prior art drawing of a boost chopper.

Shown in FIG. 1A is an alternating current ("AC") to direct current ("DC") boost chopper 100, which is prior art. There are many different configurations of circuitry of boost choppers that obtain the same end as boost chopper 100. For example, the inductor (L) 102 can be put at point 104 of FIG. 1A. Shown in FIGS. 7F and FIG. 7G are two other versions. The boost chopper 100 takes the AC input voltage, $V_I$, and converts it to a DC output voltage ($V_O$). The gate drive to the insulated-gate bipolar transistor (IGBT) 106 runs at a fixed frequency and fixed pulse width (under constant load and input AC voltage conditions). The circuit of the boost chopper circuit 100 runs in what is known as discontinuous mode—i.e., the gate pulse to the IGBT 106 is not turned on again, after being turned off, until the current in L 102 ($I_L$) has gone back to zero current. The output voltage has to be higher than the highest peak voltage, $V_P$, of the input voltage, $V_r$. The output voltage $V_O$ is controlled by the IGBT gate pulse width of IGBT 106—i.e., the wider the pulse width the more the output voltage ($V_O$) will be for a fixed load.

Figure 1C:
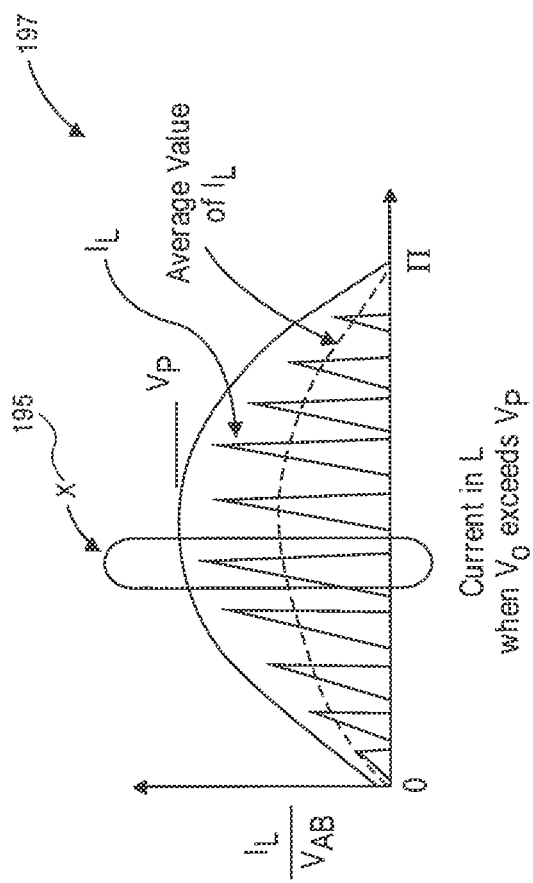
Figure 1B:
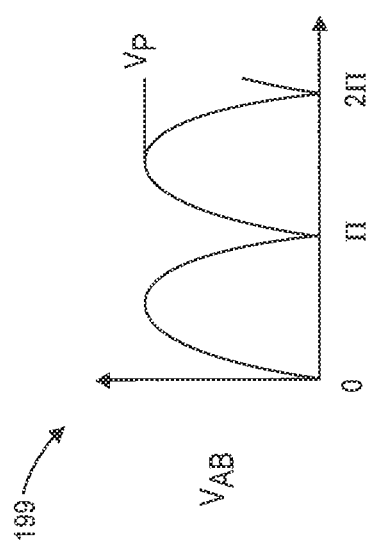

Shown in FIG. 1B is a graph 199 illustrating the voltage seen between points A and B of FIG. 1A. Assuming the voltage drop across diodes 108A to 108D is small, the voltage between point A and point B is expressed as VAB=|VP Sin θ|. Shown in FIG. 1C is a graph 197 that is an expansion of FIG. 1B for a ½ cycle of the input voltage $V_r$. Also shown in FIG. 1C is the current $I_L$ and in dotted line the average value of $I_L$. In FIG. 1C, VO is greater than Vp.

Note that the average value of $I_L$ has a very low THD (Total Harmonic Distortion). The low THD will be obtained is when $V_O$ is much larger the $V_P$. $V_O$ has to be at least 30 times the value of $V_P$ in order to have a low THD. The more $V_O$ is less than 30 times $V_P$, the greater the THD will be.

It has been found that, in most applications of the circuit shown in FIG. 1A, the output voltage is much less than required for a low THD. Shown in FIG. 1D is a graph 193 illustrating an expansion of the current shown in FIG. 1C inside section 195 of FIG. 1C. Note that with the high value of $V_O$ the fall time of the current from its peak value of $I_P$ is much less than the rise time. It is this fast fall time that is required to give a low THD in the circuit shown in FIG. 1A. When the fall time is fast the average current during any pulse cycle is proportional to the input AC voltage during any pulse cycle and therefore there is a very low THD in the AC input voltage.

Shown in FIG. 1E is a graph 191 illustrating what the current will look like during a pulse cycle when the AC voltage is at its peak value, when the output voltage ($V_O$) is only three times $V_P$. The fall time of the current is not very fast compared to the rise time. This causes significant THD in the input current. The average current $I_L$ (during a pulse cycle) is not proportional to $V_{AC}$. Note that when $V_{AB}$ is not near the peak value the fall time is faster and faster as $V_{AB}$ is at a lower and lower value.

In order to get a low THD when $V_O$ is not many times the $V_P$ the gate pulse width has to be shortened so the average current during the pulse cycle is the same as when $V_O$ is much greater than $V_P$. Shown in FIG. 1F is a graph 189 illustrating what the current $I_L$ looks like when $V_O$ is very large (triangle ABC) and when $V_O$ is only 3*Vp (triangle $AB^1C^1$) as depicted in FIG. 1E. In order to get low THD, the area of triangle ABC has to be equal to the area of triangle $AB^1C^1$.

The equation 187 for the shorter pulse as shown in FIG. 1G is:

$$t3 = t1 * \left( \sqrt{1 - \left( \frac{V_{AB}}{V_O} \right)} \right)$$

wherein $t_1$ is the time the pulse would be on with a very high $V_O$ and $t_3$ is the time required to give the same average current as when $V_O$ is very high. Note that this equation has to be calculated for each gate pulse because $V_{AB}$ changes as a function of time. Also note that when $V_{AB}$ is very small $t_3$ is essentially equal to $t_1$. Another version of the equation shown above and also shown in FIG. 1G is:

$$t3 = t1 * \left( \sqrt{1 - \left( \frac{|V_P * Sin\theta|}{V_O} \right)} \right)$$

With other versions of the AC to DC boost chopper the equation for the shorter pulse in order to get the average current (during a pulse cycle) to be proportional to the input AC voltage could be different but the concept is the same as described above.

A less complex equation that closely approximates the above equations is:

$$t3 = t1 * \left( 1 - 0.57 \left( \frac{V_{AB}}{V_O} \right) \right)$$

When VP/VO is less than 0.5, the above equation is fairly accurate. It is especially accurate under constant load conditions. The 0.57 term can then be adjusted to minimize the THD. The 0.57 term can range from approximately 0.5 to 0.65 depending on the details of the design used.

Shown in FIG. 2A is AC to DC boost chopper 200 that is similar to the boost chopper 100 described above in FIG. 1A. The schematic of AC to DC boost chopper 200 is identical to the schematic provided in FIG. 1A. The differences are the use of several control techniques 210, 230, and 250 to turn on and off the IGBT 106 in order to keep the average current per pulse cycle proportional the AC input voltage during the same pulse cycle.

FIG. 2B is the general control technique 210 to keep the average current per pulse cycle proportional the AC input voltage during each pulse cycle. FIG. 2C is the control technique 250 using the equation $$t3 = t1 * \sqrt{\left( 1 - \left( \frac{VAB}{VO} \right) \right)}$$

to keep the average current per pulse cycle proportional the AC input voltage during the same pulse cycle. FIG. 2D is the control technique 210 using the equation $$t3 = t1 * \left( 1 - 0.57 \left( \frac{VAB}{VO} \right) \right)$$

to keep the average current per pulse cycle proportional the AC input voltage during the same pulse cycle.

Figure 3A:
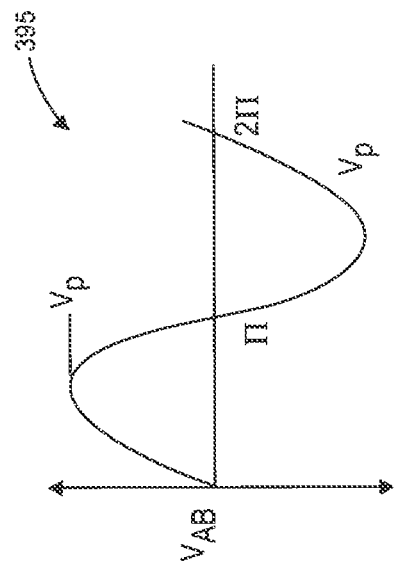
FIG. 3A is a schematic of a circuit where the average current per pulse is proportional to the AC voltage present at the time of the pulse. No pulse width modification is required to get a low THD.

Shown in FIG. 3A is an AC to DC boost chopper 300 that is similar to AC to DC boost chopper 200 described above in FIGS. 2A-2D. The circuit takes the AC input voltage, $V_r$=|VP Sin θ|, and converts it to a DC output voltage ($V_O$). The gates that drive to the IGBT's runs at a fixed frequency and fixed pulse width (under constant load and input AC voltage conditions). The circuit shown runs in what is known as discontinuous mode—i.e., the gate pulse to the IGBTs is not turned on again, after being turned off, until the current in the transformer 305's secondary has gone back to zero current. X*VO (transformer ratio times the output voltage) has to be higher than the highest peak voltage, $V_P$, of the input voltage. The output voltage $V_O$ is controlled by the IGBT gate pulsewidth—i.e., the wider the pulse width the more the output voltage will be for a fixed load. In FIG. 3A, the circuitry allowing for (X*VO) is denoted by box 307.

Figure 3C:
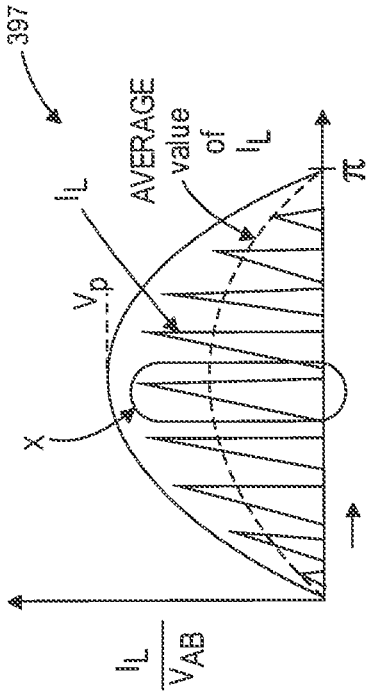
FIGS. 3B-3D are used to describe the operation and design of FIG. 3A.
Figure 3B:
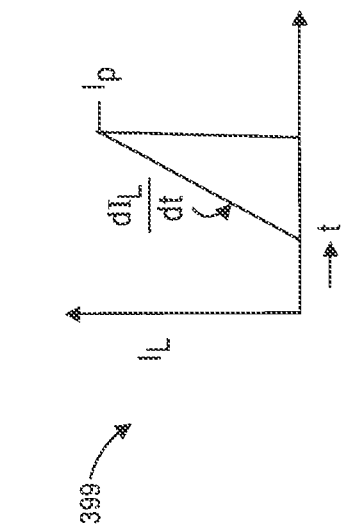
Figure 3D:
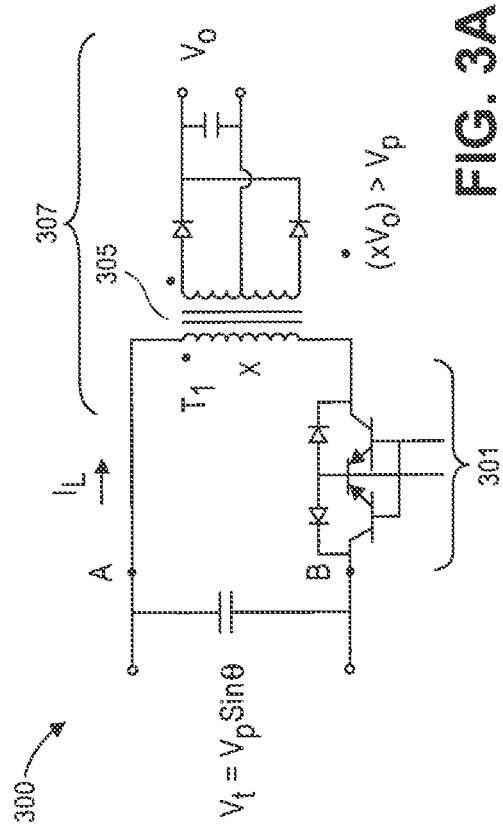

The circuit shown in FIG. 3A has the advantage of always having a fast fall time when the IGBTs 301 and 303 are turned off as shown in graph 399 of FIG. 3B—i.e., when the bi-directional switch 301 is turned off the $I_L$ goes to zero in a very fast time, denoted by t on the x-axis of graph 399, compared to the switching frequency as shown graph 397 in FIG. 3D and therefore the harmonic distortion is very low in the AC input. Shown in FIG. 3C is the waveform 395 between points A and B in FIG. 3A. Shown in graph 397 of FIG. 3D is an expansion of FIG. 3C for half cycle of the input voltage $V_r$. Also shown in FIG. 3D is the current $I_L$ and in dotted line the average value of $I_L$. As can be seen in FIG. 3D, the THD of the input AC current waveform is very low, under some conditions less than 0.01% at a very low cost.

Note that the THD of 1 and 3-phase systems with LC filters is 120% and 28% respectively. With capacitor input filters the THD is considerably higher. With the present patent application a THD of less than 0.001% can be obtained when minimum cost is not a requirement.

Shown in FIG. 3B is one pulse cycle of $I_L$ when $V_{AB}$ is at its peak value Vp as shown inside the X area of FIG. 3D. The $dI_L/dt=V_P/L_M$ where $L_M$ is the magnetizing inductance of the transformer $T_1$. It has been found that to minimize the switching voltage and current of the circuit of FIG. 3A at the same time the gate pulse for the IGBT's should be near 50% of the switching period of the IGBT's when delivering full power to the load. With the 50% requirement it has been found that:

$$L_M = (V_P)^2/(16*P_0*f_0)$$

Where:
$V_P$=the peak input voltage
$P_0$=the maximum power to the load
$f_0$=the switching frequency of the IGBT's For a complete design, the value of X in FIG. 3A has to such that $X*V_0 => V_P$ Cutting the value of $L_M$ in half allows you to do one of the following:
1. Double the power to the load.
2. Deliver full power to the load with the input AC voltage cut in ½.

Shown in FIG. 4 is a AC to DC boost chopper 400 that is the same as AC to DC boost chopper 300 in FIG. 3A except the bidirectional switch 301 has been replaced with four diodes 401A-D and one switch 403. Shown in FIG. 5A is a circuit 425 where a primary of the transformer 309 of AC to DC boost chopper 400 is put in point Z of FIG. 4. Note that transformer 307 and 309 are not exactly the same. This is because the voltage is only positive to the primary of the transformer, so only a half bridge is necessary in the secondary of transformer 309.

Generally circuits like circuit 400 (with full wave output rectifiers) would be used for fixed voltage outputs. Circuits like circuit 425 (half wave rectifiers) would be used for variable voltage outputs where the output can be either voltage or current controlled or voltage controlled with current limiting.

Shown in FIG. 5B is circuit 450 that is a more complex version of FIG. 5A. Basically the transformer 311 has two primaries. When the input voltage reverses polarity the other primary is used. The reason for showing this more complex version is that it is extendable to 3-phase circuits.

Figure 6:
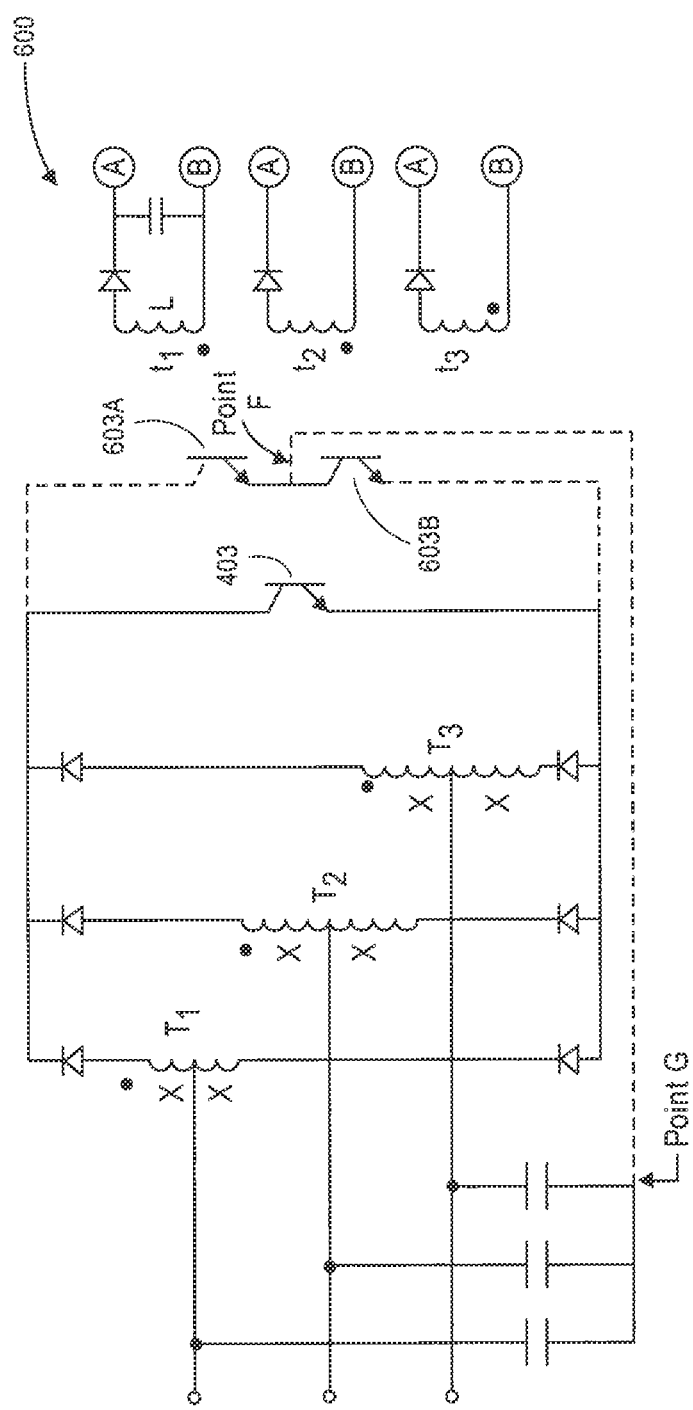
FIG. 6 is a 3-phase version of FIG. 5B. Two different shorting circuits are shown shorting out the output of the 3-phase bridge.

Shown in FIG. 6 is circuit 600 that is a 3-phase version of circuit 450 of FIG. 5B using just one IGBT (not shown) for all 3-phases. Also shown in the same figure in dotted lines is a version using two IGBTs (not shown). The two IGBTs can be used with or without dotted line between points G and F (GF), which have two switchs 603A and 603B. In a system where the 3-phase input voltages are exactly the same and the primary inductance $L_M$ in the three transformers is exactly the same there will be no current in the GF lead. With the GF connection, the 3 phase runs completely independent of each other when the 3-phase input voltages are not the same. Another reason for the two IGBTs is they can be of lower voltage rating than the one IGBT. The switching losses of IGBTs go down with a lower voltage rating. The two IGBTs are turned on and off at the same time but can be run at a higher frequency than the one IGBT versions which in turn lowers the cost of the isolating transformers.

Most of the transformers shown in the figures in the present patent application can be air-core co-axial designs. This is especially true at 3-4 kW and above. Besides the lower cost of air-core transformers another advantage of co-axial is the leakage inductance is much smaller than normal transformer design. With lower leakage inductance, the switching losses are significantly reduced when the IGBT's are turned off.

Shown in FIG. 7 are a series of circuits 700, 710, 720, 730, and 740 showing several different ways of obtaining the same results shown in the previous figures. The drawings are just some of the many variations that are possible and that still are embodiments of the present invention.

Figure 7A:
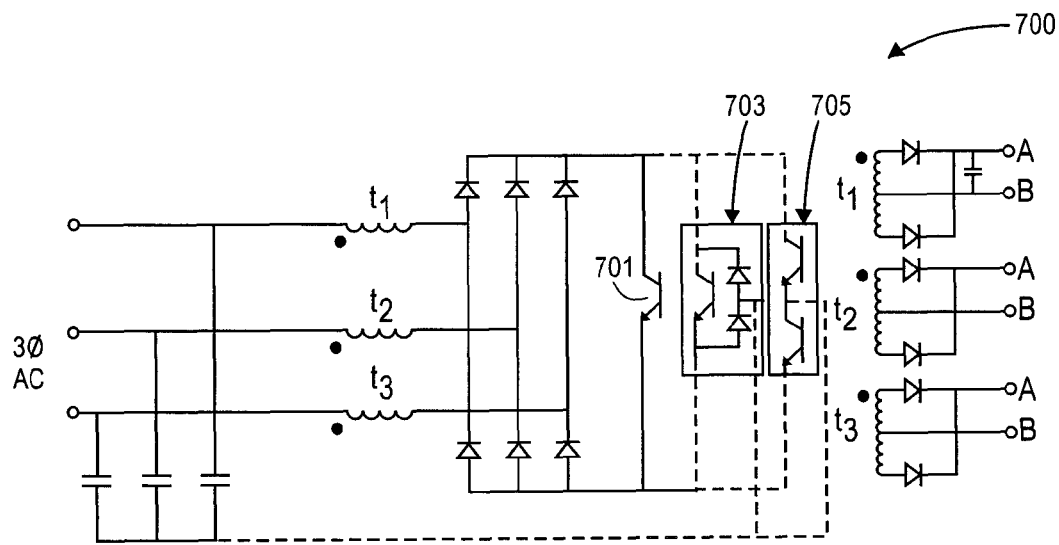
FIGS. 7A-7D are other 3-phase versions of FIG. 5B.

Shown in FIG. 7A is a circuit 700 that is 3-phase version of circuit 400 of FIG. 4. The circuit shown shows three different methods of shorting the output of the 3-phase rectifier. The first shown is just a single switch 701 across the output. The second (shown in box 703) is a method of eliminating the crosstalk between the 3-phases when input 3-phase voltages are not equal or if the primary inductance of the three transformers are not exactly the same.

The third (shown in box 705) is two series connected switches. The reason for the two series connected switches is that the voltage rating of the two switches can be less than the other two shorted methods shown. This can be important when switching losses become an issue. The lower the voltage rating of an IGBT the lower the switching losses are. The switches shown in box B are normally turned on and off at the same time.

Note that the current in the dotted lead connected to the common point of the three capacitors will be zero when the 3-phase voltages are equal and the primary inductance of the three transformers are exactly the same. With the full wave rectification in the output of the circuit shown in FIG. 7A, the circuit is best suited for fixed voltage outputs as opposed to FIG. 6, which has half wave rectification is well suited for variable voltage applications.

Figure 7B:
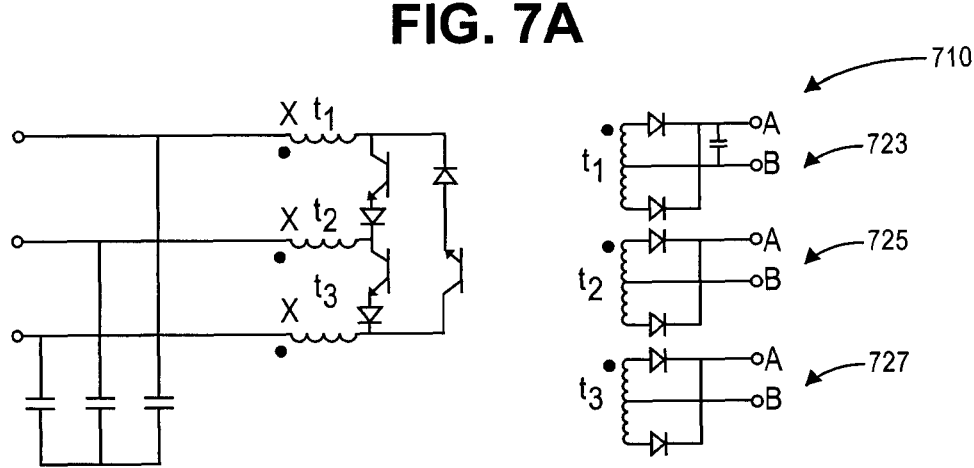

Shown in FIG. 7B is a circuit 710 that is another version of circuit 700 of FIG. 7A where the 3-phase bridge and shorting circuit across the output of the bridge is replaced with three series connected IGBT and diodes. Note that when all three IGBT's are on you get the same shorting action as obtained in FIG. 7A.

Figure 7C:
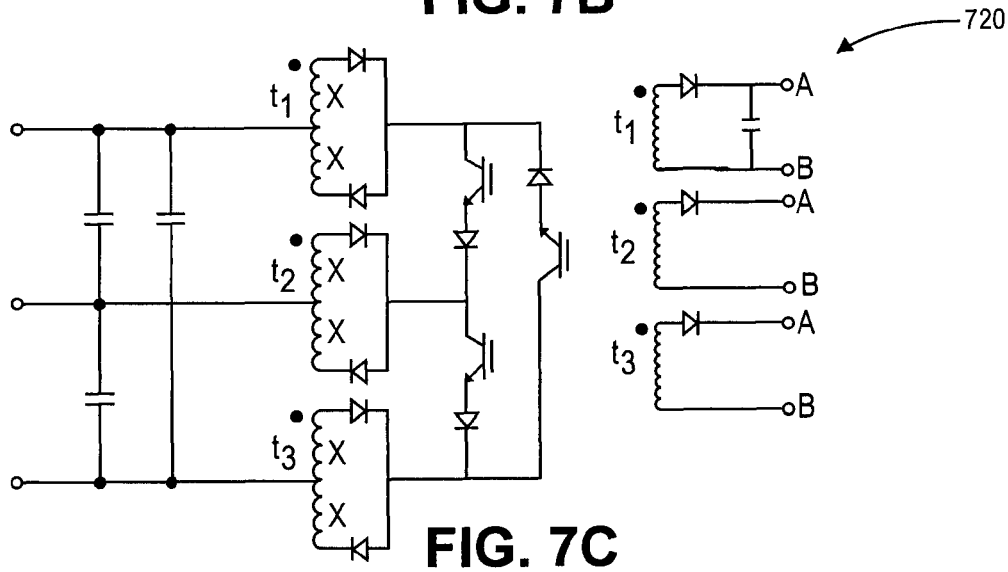

Shown in FIG. 7C is a circuit 720 that is a modification of circuit 710 of FIG. 7B where you can get half wave rectification in the three output stages that are denoted by boxes 723, 725, and 727. Each of boxes 723, 725, and 727 represents a full transformer, with a primary and a secondary.

Figure 7D:
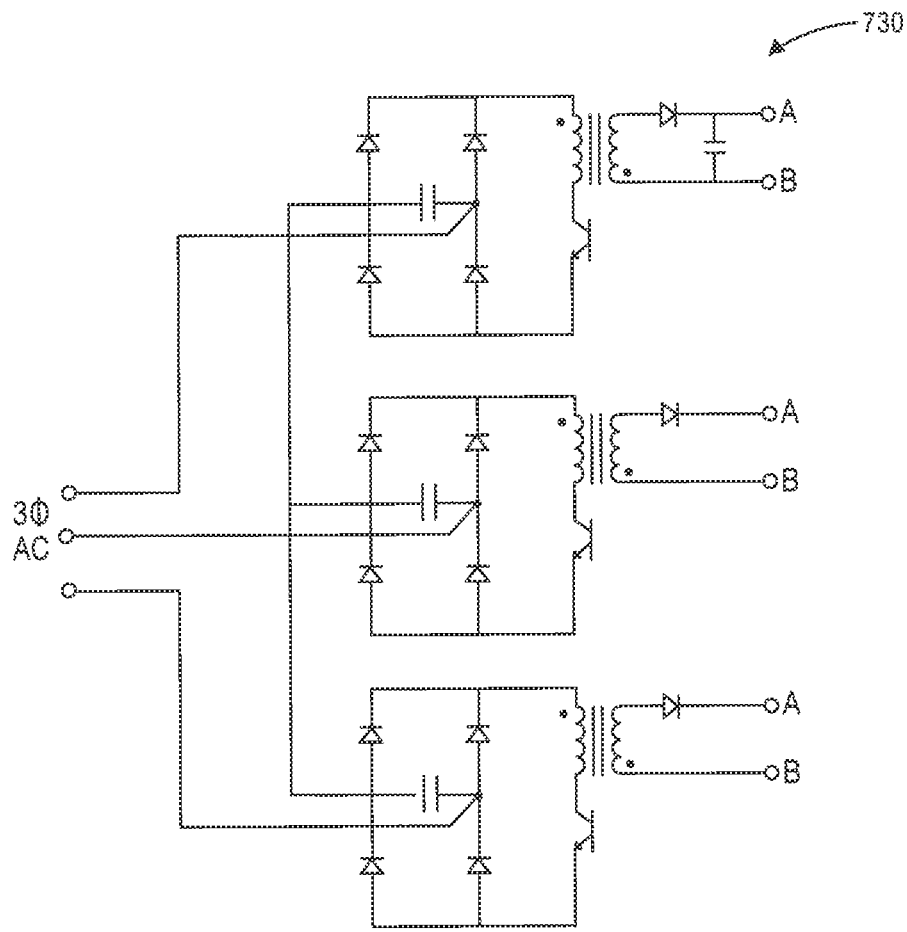

Shown in FIG. 7D is a circuit 730 that is a modification of a 3-phase version of circuit 425 of FIG. 5A. Note that most, if not all, of the single phase versions in the present patent can be used for 3-phase applications.

Figure 7E:
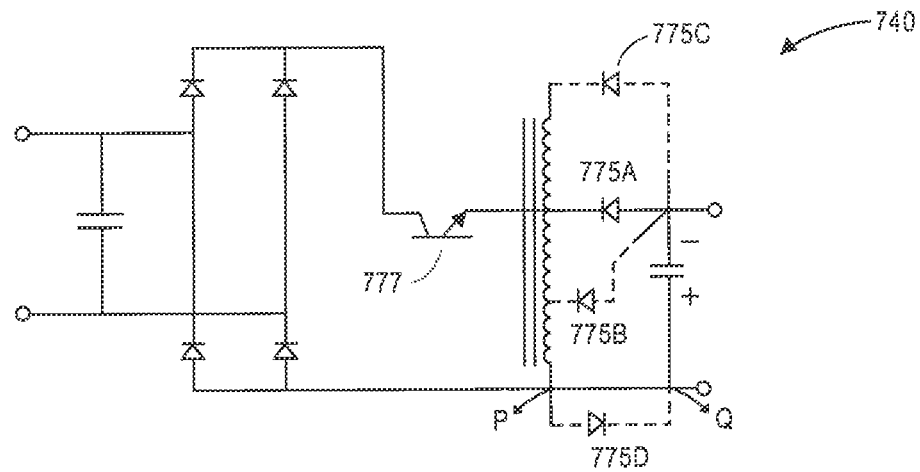
FIG. 7E is a non-isolated buck-boost circuit with the same low THD as the other circuits shown.
Figure 7F:
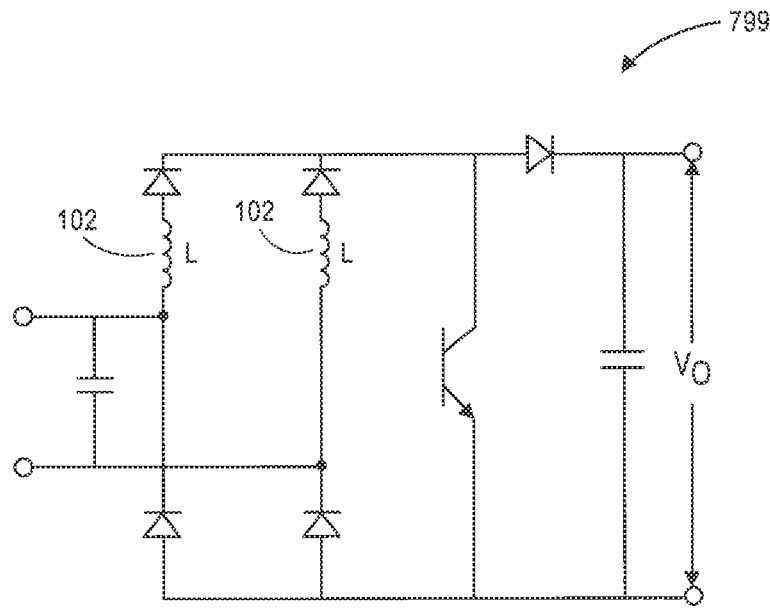
FIGS. 7F-7G are other versions of FIG. 1A, which is prior art.
Figure 7G:
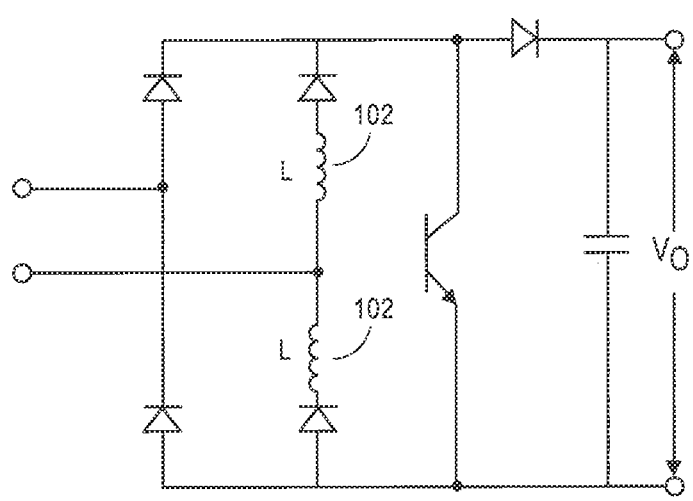

Shown in FIG. 7E is a circuit 740 that is a single phase version of circuit 730 of FIG. 7D. Circuit 740 is commonly named a buck-boost circuit. Note that this circuit has no isolation. A buck-boost circuit can deliver full power to the output above and below the input voltage. If the circuit shown output is rated low voltage high current then the switching losses in switch 777 will be high due to the high current in the switch 777. If the circuit shown output is rated a high voltage low current then the switching losses in switch 777 will be high due to the high switching voltage.

In order to optimize the switching losses in switch 777 for both high voltage and high current operation the following modifications can be made. If running high current and low voltage operation the diode 775A can be moved down the inductor as shown where diode 775B is connected. If running high voltage operation, an over wind can be put on the inductor and diode 775A can be moved to where diode 775C is shown. Also note that in 3-phase applications the circuit of FIG. 7E diode 775D has to be added in the lead labeled PQ.

The embodiments disclosed cover all the single and 3-phase isolated and non-isolated versions (with the full bridge and half bridge outputs) where the current has a natural fast fall time compared to the rise time.

Shown in FIGS. 7F and FIG. 7G are two other versions of the prior art figure shown in FIG. 1A. Specifically, FIG. 7F shows a prior art circuit 199 and FIG. 7G shows a prior art circuit 197. Several other versions are possible.

In the foregoing specification, the embodiments described herein have been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A boost chopper circuit to operate in a discontinuous current mode, comprising:
    an alternating current (AC) power source to supply an AC voltage;
    a first capacitor in parallel with the power source;
    a full-wave rectifier having an input coupled in parallel with the first capacitor;
    a first series circuit comprising an inductor and a switching device, wherein the first series circuit is coupled in parallel with an output of the full-wave rectifier, wherein a negative side of the switching device is coupled to a negative side of the full-wave rectifier;
    a second series circuit comprising a diode and a second capacitor, wherein the second series circuit is coupled in parallel with the switching device, wherein an anode of the diode is coupled to a collector of the switching device;
    a load coupled in parallel with the second capacitor;
    a controller coupled to the switching device to provide a plurality of pulses to turn on and of the switching device in order to keep an average inductor current per pulse proportional to the AC voltage during a same pulse cycle to minimize total harmonic distortion (THD),
    wherein the controller controls each pulse width according to the following equation:

$T_3 = T_1 \cdot (1 - V_{AB}/V_O)^{1/2}$, wherein $V_O$ is an output voltage across the second capacitor, $V_{AB}$ is a rectified voltage provided by the full-wave rectifier, $T_1$ is a pulse width that keeps the average inductor current per pulse proportional to the AC voltage when $V_O$ is at least 30 times $V_{AB}$, and $T_3$ is a width of each pulse provided by the controller to the switching device.

2. A boost chopper circuit to operate in a discontinuous current mode, comprising:
    an alternating current (AC) power source to supply an AC voltage;
    a first capacitor in parallel with the power source;
    a full-wave rectifier having an input coupled in parallel with the first capacitor;
    a first series circuit comprising an inductor and a switching device coupled in parallel with an output of the full-wave rectifier, wherein a negative side of the switching device is coupled to a negative side of the full-wave rectifier;
    a second series circuit comprising a diode and a second capacitor, wherein the second series circuit is coupled in parallel with the switching device, wherein an anode of the diode is coupled to a collector of the switching device;
    a load coupled in parallel with the second capacitor;
    a controller coupled to the Twitching device to provide a plurality of pluses to turn on and off the switching device in order to keep an average inductor current per pulse proportional to the AC voltage during a same pulse cycle to minimize total harmonic distortion (THD),
    wherein the controller controls each pulse width according to the following equation:

$T_3 = T_1 \cdot (1 - X \cdot V_{AB}/V_O)$ wherein $V_O$ is an output voltage across the second capacitor, $V_{AB}$ is a rectified voltage provided by the full-wave rectifier, X is varied from 0.50 to 0.65 to minimize the THD, $T_1$ is a pulse width that keeps the average inductor current per pulse proportional to the AC voltage when $V_O$ is at least 30 times $V_{AB}$, and $T_3$ is a width of each pulse provided by the controller to the switching device.

3. A boost chopper circuit to operate in a discontinuous current mode, comprising:
    a alternating current (AC) power source to supply an AC voltage;
    a first capacitor in parallel with the power source;
    a full-wave rectifier having an input coupler in parallel with the first capacitor;
    a fist series circuit comprising an inductor and a switching device coupled in parallel with an output of the full-wave rectifier, wherein a negative side of the switching device is coupled to a negative side of the feel-wave rectifier;
    a second series circuit comprising a diode and a second capacitor, wherein the second series circuit is coupled in parallel with the switching device, wherein an anode of the diode is coupled to a collector of the switching device;
    a load coupled in parallel with the second capacitor;
    a controller coupled to the switching device to provide a plurality of pulses to turn on and off the switching device in order to keep an average inductor current per pulse proportional to the AC voltage during a same pulse cycle to minimize total harmonic distortion (THD), wherein the controller controls each pulse width according to the following equation:

$$T_3 = T_1 \cdot (1 - X \cdot V_{AB}/V_O),$$

wherein $V_O$ is an output voltage across the second capacitor, $V_{AB}$ is a rectified voltage provided by the full-wave rectifier, X is 0.57, $T_1$ is a pulse width that keeps the average inductor current per pulse proportional to the AC voltage when $V_O$ is at least 30 times $V_{AB}$, and $T_3$ is a width of each pulse provided by the controller to the switching device.

* * * * *